Figure 3:
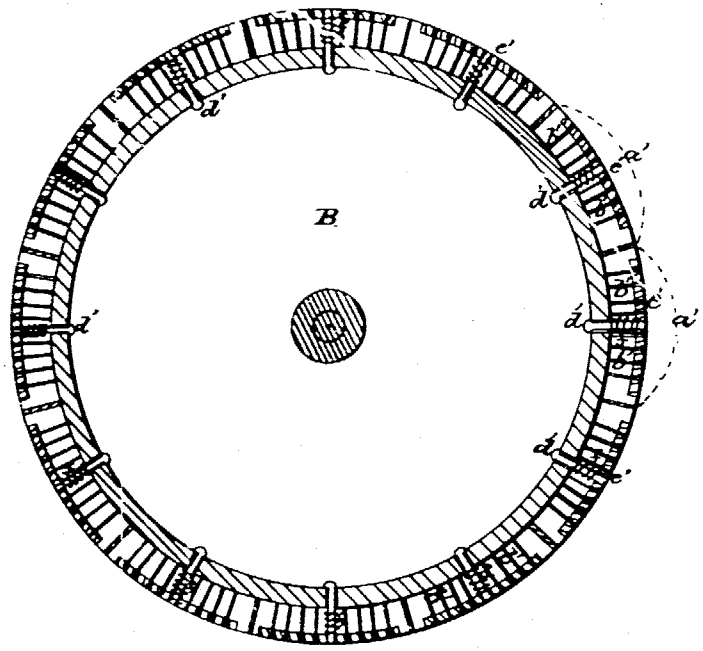

No Printed Specification Available
Sheet 1-2 Sheets.
6963X
J. & C. Bruce,
Cracker Machine,
Patented Mar. 13, 1832.
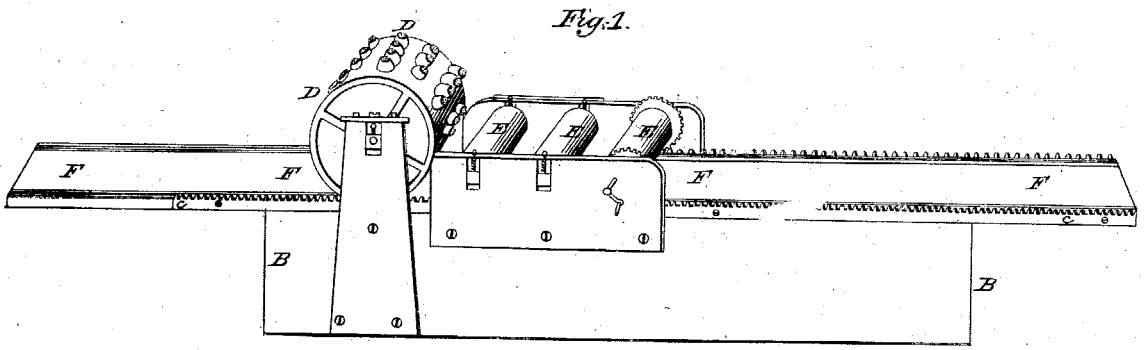
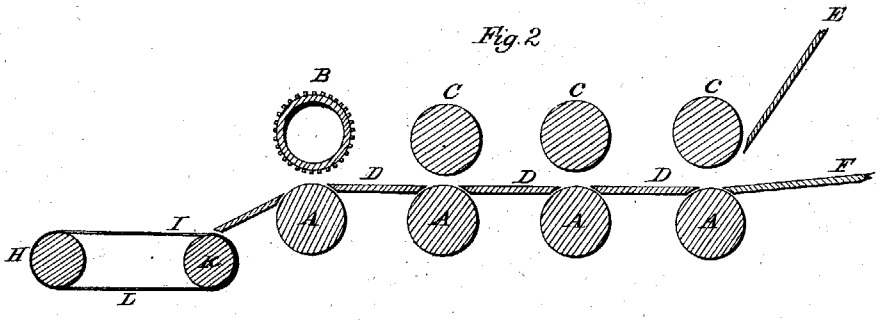
N. PETERS, PHOTO-LITHOGRAPHER, WASHINGTON, D. C.

Sheet 2. 2 Sheets.

6963X

J. & C. Bruce,

Cracker Machine,

Patented Mar. 13, 1832

Witnesses:

J. L. Smith
W. Ker Smith,
Richard Paulton
John P. Bruce

Inventors:

John Bruce
Charles Bruce

N. PETERS, PHOTO-LITHOGRAPHER, WASHINGTON, D. C.

6963x [illegible] Mar 13, 1832 19

John Bruce and Charles Bruce.

Letters Patent.

The Schedule referred to in these Letters Patent and
making part of the same, containing a discription in the words
of the said John Bruce and Charles Bruce of their improvements
in the Machine for manufacturing Ship Biscuit pilot bread
crackers &c.

Know all whom it may concern by these presents. that we John Bruce
of the County of Kings and Charles Bruce of the same County & State of
New York. have invented and discovered a new and usefull machine for
Manufacturing or forming from the dough of flour and other usual mate-
rials. what is commonly called ship biscuit Navy and pilot bread crack-
ers, New year cakes ginger nuts, tea biscuit &c &c. and that a specification
of the aforesaid Machine is contained in the words following. A long or
rectangular slab of suitable length, width and thickness and made of
wood or other material or materials is to be provided having its two
longest surfaces perfectly plane or level & parallel with each other. A
piece of frame work is to be prepared among other things, to receive this
in such a manner that its two larger surfaces may be parallel with the
horizon or as near thereto as may be convenient and in such manner
also that with the aid of a groove or grooves or other similar contrivance
made in or attached to the said frame it may be moved backward and
forward in the direction of its length a sufficient and convenient distance.
The use of this slab is to receive at one end of it and on the uppermost surface
of the same, the dough from which is intended to be made the aforesaid
ship biscuit Navy and pilot bread, crackers, New year cakes, Ginger nuts,
tea biscuit &c &c. and being put in motion by any convenient power shall
serve to convey the said dough underneath two, three or more cylindrical
rollers placed crosswise over the said slab, with their axes parallel to
one another and parallel also to the said slab but successively [illegible]
nearer nearer to the said slab as they are located farther from that end of the
frame first receiving the dough.— The dough being thus conveyed
on the said slab, underneath the said rollers is pressed into a flat
form and spread evenly over and upon its surface every time it pass-
es under any one of the said rollers becoming thinner than it was before
till having passed under that roller which is farthest from that end
of the frame which first receives the dough it is brought as near as may
be to the intended thickness of the aforesaid ship biscuit, navy or pilot
bread, crackers, New Year cakes, ginger nuts, tea biscuit &c. &c.
A still further use of this slab, is after having in conjunction with the rollers
already mentioned, pressed or spread the dough into its flat and proper form and
thickness, to convey it under the cylinder hereafter and herein to be described and
named the cutting cylinder for the purpose of being cut into pieces of the required
shape and such as we have already mentioned. Effectually to make the said rect
angular slab serve the purpose required of it, it is necessary that, to one or both
vert[illegible] sides of the said slab should be attached to what is usually called
a rack with teeth on its upper side working into teeth of a wheel fastened and
belonging (in preference) to that particular cylindrical roller, which is near-
est to that end of said frame, which first receives the dough, and in order
to keep the dough from spreading sideways so as to encroach upon said [illegible]
the teeth of the said rack as also the teeth of the wheel into which it works
a strip of any suitable material, and of sufficient height, is to be made
fast in the uppermost surface of the said slab in such a manner as to be
in the direction of its length at or near each edge of the said slab, and extending
the whole or nearly the whole length thereof; Motion backwards and forwards
will be alternately given to the aforesaid slab, by the use of a crank or other
machine attached to the shaft of the cylindrical roller last mentioned
and moved by the hand or other similarly regulated power in an alternate
manner. The cylindrical rollers two, three, four, or more, of them are secured
in the frame which receives and contains the aforesaid slab. They are
placed over it in such manner that their axes are at right angles to the
length of the slab, and by screws or any other convenient machinery
they are made capable of being elevated or depressed so as to bring further 69963x Mar. 13, 1832 further from or approach nearer to the upper surface of the said slab,
as occasion may require. a wheel (and it has been already referred to)
is attached to the shaft of that particular cylindrical roller, which
is nearest to that end of the aforesaid frame at which the dough
is first received and works into the teeth of the rack immediately
below it, giving motion to it, and of course to the slab itself to which
it is perminently secured in a backward and forward manner.
But if the wheel first described be made fast to the shaft of the particular
cylindrical roller, above named the shaft of no other cylindrical roller need
have any wheel attached to it. all other rollers will be moved by the mere
contact and pressure of the dough between them and the slab. It will
be understood also that the two strips intended to prevent the dough
from encroaching upon the rack or racks above mentioned will require
that all the cylindrical rollers be so shaped as to admit the said strips
to pass freely under them. They will or rather should be so shaped accordingly.
The piece of Machinery intended to be made use of in cutting the dough
into the desired forms after it shall have been rendered flat and of
an equal and proper thickness is a cylinder which we shall name
the cutting cylinder supplied with what we shall call cutters. Like the
cylindrical rollers already mentioned for flattening the dough it stands
over or above the aforesaid slab, but in such manner as to press evenly
on it, and having its axis crosswise, or at right angles to the direction of
the length of the slab; It is situated, in the frame further from that end
of it at which the dough is first received than any of the cylindrical rollers
above mentioned, and of course as near as may be to the one which brings
the said dough to the desired thickness. The cutters if not made of a piece
with the cylinder itself, as they may be, tho not perhaps with the same
convenience as in another manner, are inserted into the said cylinder by
the aid of screw-work, or otherwise, if the biscuit &c. &c. be of a circular shape
circular holes of a suitable diameter may be drilled or bored at right angles
to the axis, into the cutting cylinder, so as to penetrate into its interior the
said cutting cylinder of course being hollow and either with or without the
ends of the same being closed at the pleasure of the owner. Into these
holes holes or perforations are secured or otherwise made fast short cylin-
drical tubes having an internal diameter equal to that which the
biscuit &c. &c. is intended to possess: That extremity of each cylindrical
tube which may be called the bottom, and which is nearest, in point of
distance to the axis of the aforesaid cutting cylinder has its apperture
closed up with a plate either separately attached or of a piece with the tube
itself. The length of each of these short cylindrical tubes should not be
less than three, four, or six times the thickness of the proposed biscuit &c.
Into every such plate when the biscuit &c. requires to be p[illegible] there should
be inserted and made fast thereto as many cylindrical or other shaped
wires as may be necessary to perforate the biscuit &c. sufficiently, these
wires should be made somewhat sharp and pointed, they should be placed
as near as may be equi distant from each other, and their external extre-
mities should terminate in the external curvature of the aforesaid cut-
ting cylinder; In the center of the plate which closes the bottom of each of
the short cylindrical tubes is inserted but in a loose and not perma-
nent manner, another cylindrical or other shaped wire and which we
will call the central wire. standing at right angles to the axis of
the aforesaid cutting cylinder, having an enlargement, head or nut on
that extremity of it which appears within the cavity and being of such
a length that the other extremity terminates in the external surface
of the said cutting cylinder. To the external extremity is secured in a
permanent manner a circular plate not flat but curved to the periphery of
the aforesaid cutting cylinder of a diameter nearly equal to that of the tube
in which it is located and having as many perforations made in it as
there are cylindrical or other shaped wires as already mentioned made
into the plate in the extremity of the tube opposite to it, these perforations
being somewhat larger than the wires which pass thro them. Between
the two plates in the two opposite extremities of each of the short cylin-
drical tubes above mentioned one made fast to the said tube the other
moveable in it, is a spiral or other spring or springs the intention of which
is to allow the outermost and moveable plate, as the dough is pressed
into the tube to recede or retreat from before it and when the cutting
cylinder cylinder shall have turned sufficiently to admit of it, to expel the biscuits
&c. before mentioned from the tube already perforated and fit to be put in
the oven. The use of the enlargement, head or nut on the internal extremity
of the aforesaid [illegible] wire is to prevent the external and moveable plate
to which it is attached from falling out of its tube, when it is in a declining
or pendent position. It need scarcely be added that the external surface of
the last mentioned plate may have any name or device engraved or other
-wise made upon it that may be desired. and this will be the more easily
effected in the making those articles the dough of which does not require
to be perforated, for in this case no wires will be wanting in any of the
short cylindrical tubes except the central wire and of course no perforation
whatever in the moveable plate; The short cylindrical tubes in order to en
-able the operator to obtain the greatest number of pieces of biscuit &c.
from a given quantity of dough should be arranged in longitudinal series
in such manner that the individual tubes of any two contiguous series
should not be opposite to, but exactly intermediate between those of each
other, the distance apart of these tubes in every direction being the least
possible that circumstances will admit. In using the machine as thus
far described and which is complete, the dough is placed upon the slab after
the slab itself as well as the remaining machinery have been dusted over
with flour to prevent its sticking, the roller nearest to the dough is
set in motion by a crank or any other means, this carries the slab with
the dough upon it underneath the said roller, and the motion being so
continued underneath another & another until it be sufficiently flatten
-ed when the motion being still continued the dough is carried under
the cutting cylinder, enters the short cylindrical tubes aforesaid
pressing inward the moveable plates before described and deliver
ing the biscuit &c &c. by the action of the spiral springs so soon as
the cutting cylinder shall have turned so far from the aforesaid
slab as to admit of it. When the whole plate of dough shall have
passed under the said cutting cylinder and a proper distance beyond
it, the biscuit &c &c. are to be passed to the oven, the remnants
placed among the dough the slab &c. turned back to its former
position 178 6963x Mar. 13, 1832 position and the same process repeated. Perhaps a still better method of constructing a machine embracing the same principles will be as follows. Let there be provided a suitable frame of wood or other material in which are to be secured, so that they may be capable of revolving when applied to use four or more cylindrical rollers of the same length as the aforesaid cutting cylinder of convenient, and better probably than otherwise, of one and the same diameter. Let the axis of these be so placed so that the upper surface shall be in one and the same horizontal plane, and let this plane, as near as may be convenient, be coin=cident with the horizontal plane of the aforesaid frame;
The three or more cylindrical rollers first above mentioned in this one specification together with what we have denominated the cutting cylinder are placed immediately over the said four cy=lindrical rollers just in the present modification described and at the same distances therefrom as they were directed to be from the rectangular slab aforesaid; and of the four last men=tioned cylindrical rollers, to wit, that over which is placed the cutting cylinder aforesaid may have its external curved surface composed of some suitable elastic covering for the purpose ~~for the purpose~~ of enabling the short cylindrical cutting tubes more effectually to perform their duty than they otherwise might.—
To obtain the proper proportionate velocities of these various cylinders &c. let appropriate pullies or wheel work be made use of to connect such of the machinery as revolves, and let also sta=tionary slabs or planes of wood or other suitable material or small revolving rollers be placed between each successive pair of cylindrical rollers to support the dough from falling while it is being conducted to the next pair, and the operation may probably be better done than by the machine first and herein described. At that end of the frame at which the dough is received ~~a conveniently~~ inclined table or hopper should be provided and made fast to the said frame the use of which table or hopper is to introduce the dough ~~between~~
the 6963x Mar 13, 1832 the first and more distant pair of cylindrical rollers thence by the
agency of the aforesaid stationary slabs or small revolving rollers
to be conducted to the second and less distant pair of rollers, thence again
by the slab or its substitute, roller or rollers to the third and still less distant
pair of rollers, and ultimately to the cutting cylinder aforesaid when it
is to be made into the form of biscuit &c. &c.
At the opposite end of the frame aforesaid an inflexible plane, inclined
at a convenient angle to the horizon of a convenient length, & having a width
equal to the length of the cylindrical rollers aforesaid is to be made fast in
such a manner as best to avoid touching the cylindrical roller over which
is placed the cutting cylinder. Down this inclined plane it is intended
the biscuit &c. &c together with what may be called the scraps or refuse dough
shall fall or descend and then be received on a feeding cloth having a
width equal to the length of the aforesaid cutting cylinder which feeding
cloth passes horizontally around two cylindrical rollers so as to fit
tight thereon and from which the biscuit &c. are to be taken and carried
to the oven and the refuse dough to be worked over again and lastly it is
possible that the work we desire our machinery to perform may be
done best of all, by constructing it in such a manner that the dough
shall descend vertically downwards or nearly so till it comes to the
cutting cylinder aforesaid which will deliver it by the help of the
inclined plane aforesaid upon the horizontal feeding cloth just
mentioned. In this latter case, neither the intervening slab or slabs
nor roller or rollers will be of any use or if so of very little, all that is
important is by wheels or pulleys; to give the proper and appropriate
velocities to the different pieces requiring to be put in motion.
It is to be added that obvious means very similar to those already
herein described are requisite to be resorted to in all these modi-
fications of our principles or rather of our Machinery to prevent
the dough from spreading beyond the extremities of the cylindri-
cal rollers and the cutting cylinder;

It remains now for us to say in what consists that which
we claim as new and original with us in the foregoing described
Machinery

[illegible] 6963x Mar 13, 1832 machinery. We claim as new, the use of two or more cylindri-cal rollers successively to reduce the dough to its desired thick-ness in connection with the aforesaid cutting cylinder, And we claim as new the use of the aforesaid cutting cylinder containing cutters of the ordinary description whether it be so constructed as to make circular biscuit [illegible] or the same or similar articles of any other shape or form whatever.

Witnesses
Peter P. Stagg
John S. Cameron
Wm I Ruggles

John Bruce
Charles Bruce

Ex.d [illegible]

[[illegible] words